Jan. 13, 1925.  1,522,783
A. H. LACEY ET AL
VEHICLE RUNNING GEAR AND DRIVING MECHANISM
Filed Nov. 19, 1923  2 Sheets-Sheet 1

INVENTORS
A. H. LACEY
C. M. CROSSON
BY
their ATTORNEYS

Jan. 13, 1925. 1,522,783
A. H. LACEY ET AL
VEHICLE RUNNING GEAR AND DRIVING MECHANISM
Filed Nov. 19, 1923 2 Sheets-Sheet 2

INVENTORS
A.H.LACEY
C.M.CROSSON
BY
White Prost Evans
their ATTORNEYS

Patented Jan. 13, 1925.

1,522,783

UNITED STATES PATENT OFFICE.

ARTHUR H. LACEY AND COLUMBIA MONROE CROSSON, OF OAKLAND, CALIFORNIA.

VEHICLE RUNNING GEAR AND DRIVING MECHANISM.

Application filed November 19, 1923. Serial No. 675,570.

*To all whom it may concern:*

Be it known that we, ARTHUR H. LACEY and COLUMBIA MONROE CROSSON, citizens of the United States, and residents of Oakland, county of Alameda, and State of California, have invented a certain new and useful Vehicle Running Gear and Driving Mechanism, of which the following is a specification.

The invention relates to road vehicles and particularly to the running gear and driving mechanism thereof.

An object of the invention is to provide a driving mechanism for four driving wheels in which the amount of unsprung weight is reduced to a minimum.

Another object of the invention is to provide a running gear which will cause a minimum transmission of road shock to the vehicle frame.

A further object of the invention is to provide means for preventing torsion in the leaf springs which are interposed between the running gear and the vehicle frame.

The invention possesses other advantageous features, some of which with the foregoing, will be set forth at length in the following description, where we shall outline in full, that form of our invention which we have selected for illustration in the drawings accompanying and forming part of the present specification. In said drawings we have shown one form of apparatus embodying our invention, but it is to be understood that we do not limit ourselves to such form, since the invention, as set forth in the claims, may be embodied in a plurality of forms.

Referring to said drawings:—

Figure 1:
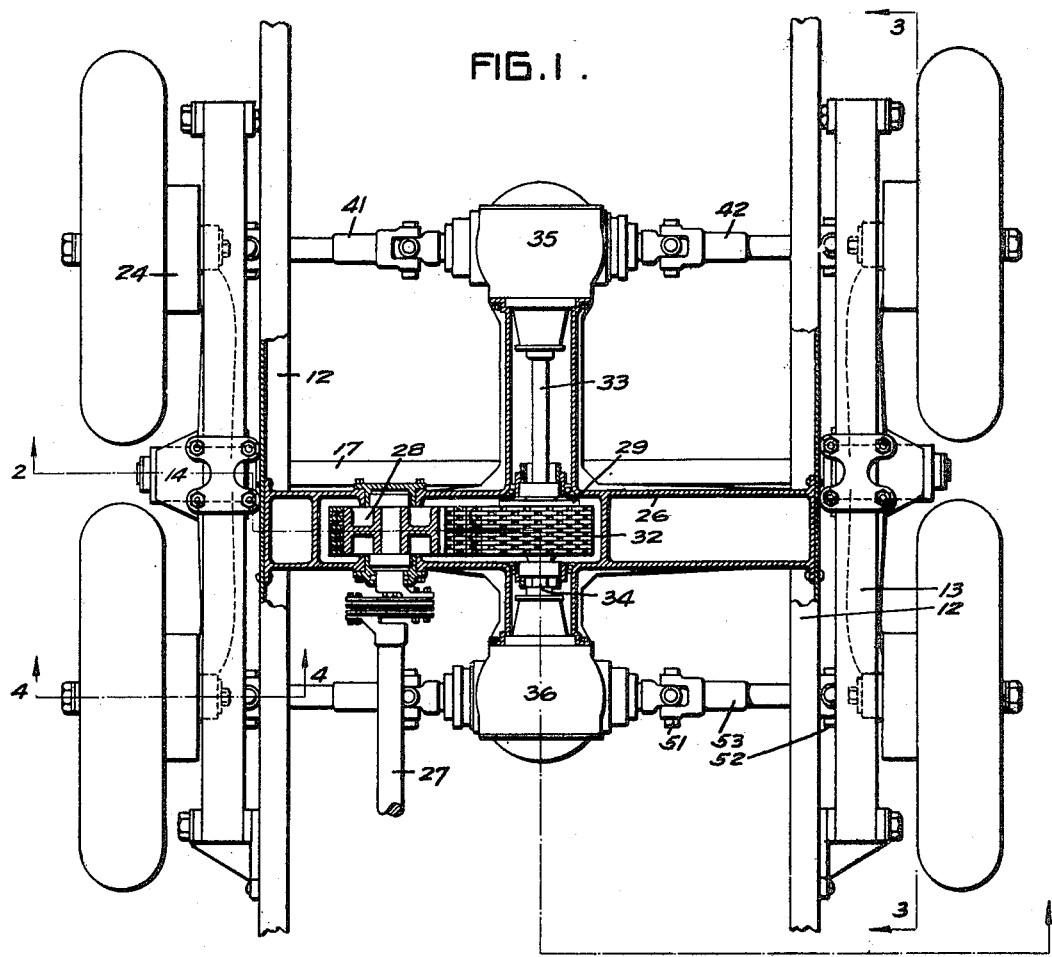
Figure 1 is a plan view, partly in section, of the rear end of a road vehicle equipped with the running gear and driving mechanism of our invention.
Figure 2:
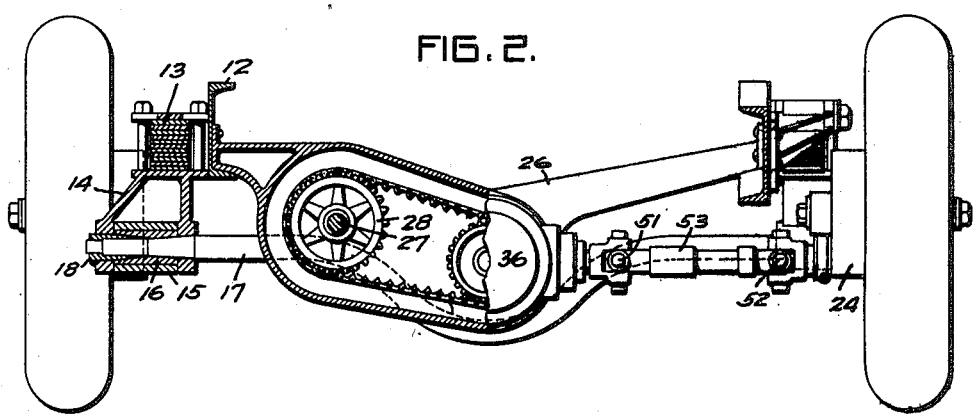
Figure 2 is a combined section and elevation taken on the line 2—2, Figure 1.
Figure 3:
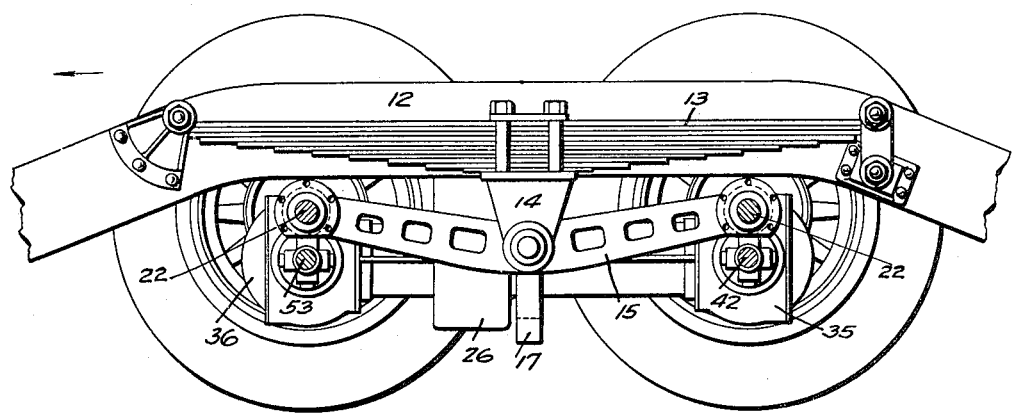
Figure 3 is a section taken on the line 3—3, Figure 1.
Figure 4:
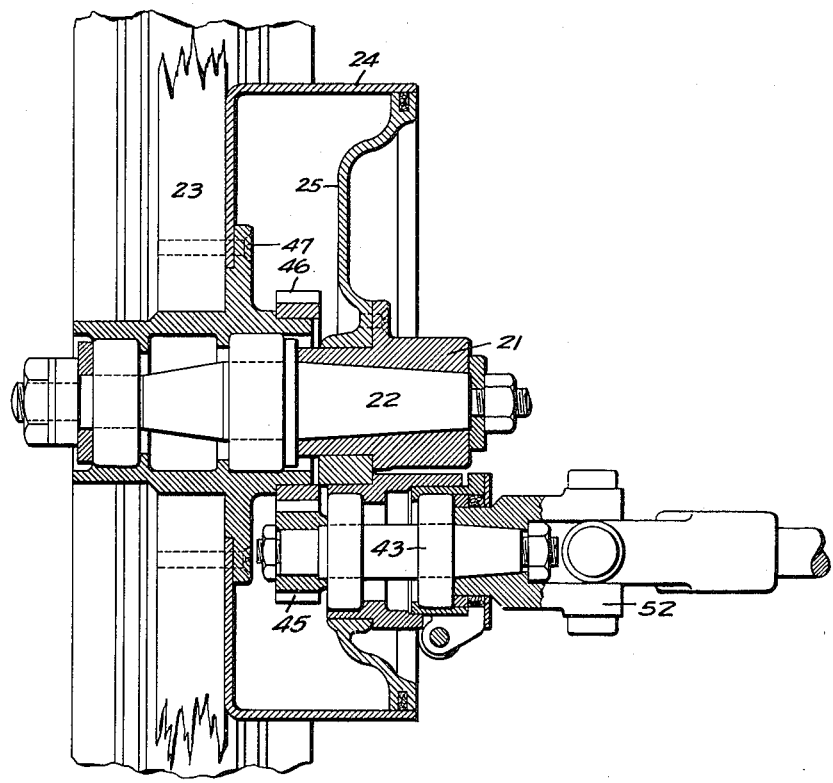
Figure 4 is a section, on a larger scale, of the connection between the driving shaft and the wheel, taken on the line 4—4 Figure 1.

Our invention relates to a road vehicle and particularly to a road vehicle of the type having four driving wheels at its rear end. The invention relates particularly to the means for driving these wheels and the connection between the wheels and the vehicle frame. The wheels are arranged in pairs on parallel axes, there being two wheels on each side of the frame. Springs are interposed between the wheels and the frame and the driving mechanism is rigidly supported on the frame and the wheels are connected to the driving mechanism by flexible shafts, so that there is a minimum of unsprung weight.

Arranged at each side of the frame 12 is a long leaf spring 13 pivoted to the frame at its forward end and shackled thereto at its rearward end. Secured to the spring at its center is a bracket 14, extending below the spring and on which the rigid equalizing beam 15 is fulcrumed at its center. The beam 15 is fulcrumed on a sleeve 16 and the sleeve is held in position by the cross bar 17 which is connected to the bracket on the opposite side of the frame. This cross bar is rigid and serves to prevent lateral movement of the bracket 14 thus preventing torsion in the springs 13. Wear on the sleeve is taken up by adjustment of the conical member 18 surrounding the end of the cross bar.

At each end, each equalizing beam is provided with a tapered seat 21 to which the wheel spindle 22 is secured. The four wheels 23 are respectively mounted on the spindles 22 secured to the ends of the equalizing beam. Each wheel is preferably provided with a brake drum 24 and the brake drums are closed on their inner side with closing plates 25 which are secured to the ends of the equalizing beam.

Means are provided for differentially driving each of the four wheels of the drive. Mounted on the vehicle frame 12 is a housing 26 in which the driving mechanism is disposed. The rear end of the propeller shaft 27, which is offset to one side of the frame, is journalled in the housing 26 and is provided on its end with a sprocket 28 which drives the main differential housing 29 by the chain 32. From the housing 29 extend the two differentially driven driving shafts 33 and 34 which extend into the differential housings 35 and 36. These housings are rigidly secured to the housing 26, forming therewith a rigid unit, which is secured to the vehicle frame. Extending from each differential housing 35 and 36 are a pair of laterally disposed drive shafts 41 and 42 by which the wheels are driven. The shafts 41 and 42 are journalled at their outer ends in bearings 43 mounted in the cover plate 25 or in seats secured to the ends of the equalizing beams 15. The driving shafts are provided on their ends with gears 45 which mesh with gears 46 secured to the wheel hubs 47. The differences in diameter of the gears 45 and 46, provide the desired speed reduction. By arranging the speed reduction gear at the wheels, the torque of the driving shafts is low so that these parts may be made lighter. Since there is relative vertical movement between the frame 12 and the ends of the equalizing beam 15, the transverse driving shafts 41 and 42 are provided with universal joints 51 and 52 and with slip-joints 53. This provides a very easy riding running gear in which each of the four wheels is independently movable in passing over an obstruction so that the amount of road shock transferred to the vehicle frame is reduced to a minimum. Furthermore, any wheel may rise or fall without any effect on the position, or direction of rotation of any other wheel. Another result obtained is that all torque reactions are absorbed in the housing unit, and no torque arms, or other provisions are required. While we have shown the vehicle provided with long substantially flat leaf springs connected at their ends to the vehicle frame, it is to be understood that our invention contemplates the use of other forms of spring suspension, such, for instance, as cantilever springs.

We claim:

1. A road vehicle comprising a frame, a rigid equalizing beam arranged at each side of the frame, a spring arranged above each equalizing beam and connected to the frame, each beam being fulcrumed intermediate its ends on said spring, spindles rigidly secured in the ends of said beams, wheels journalled on said spindles, driving mechanism mounted on the frame and flexible shafts connecting the driving mechanism with the wheels.

2. A road vehicle comprising a frame, a rigid equalizing beam arranged at each side of the frame, spring means interposed between said beams and the frame, spindles rigidly secured in the ends of said beams, wheels journalled on said spindles and flexible driving shafts operatively connected to said wheels.

3. A road vehicle comprising a frame, a rigid pivoted equalizing beam arranged at each side of the frame, spring means interposed between the frame and the fulcrums of said beams, spindles rigidly secured in the ends of said beams, wheels journalled on said spindles, driving mechanism carried by the frame and flexible shafts connecting the driving mechanism with the wheels.

4. A road vehicle comprising a frame, a rigid equalizing beam arranged on each side of the frame, pivots on which said beams are fulcrumed, rigid means connecting the pivots on opposite sides of the frame together, spring means interposed between said pivots and the frame, spindles rigidly secured in the ends of said beams and wheels mounted on said spindles.

5. A road vehicle comprising a frame, a rigid equalizing beam arranged at each side of the frame, and resiliently connected thereto intermediate its ends, spindles rigidly secured in the ends of said beams, wheels journalled on said spindles, a gear secured to each wheel, a driving gear in mesh with each of said gears and flexible driving shafts secured to said driving gears.

6. A road vehicle comprising a frame, a rigid equalizing beam arranged at each side of the frame, means to which the beam is pivotally connected intermediate its ends and resiliently connecting the beam to the frame, spindles rigidly secured in the ends of said beams, wheels journalled on said spindles, a power transmission housing secured to the frame, transmission mechanism in said housing, wheel driving shafts extending laterally from said housing to said wheels and universal joints in said shafts.

7. A road vehicle comprising a frame, a rigid equalizing beam arranged at each side of the frame, means to which the beam is pivotally connected intermediate its ends and resiliently connecting the beam to the frame, spindles rigidly secured in the ends of said beams, wheels journalled on said spindles, a gear secured to each wheel, a bearing secured to each beam adjacent the spindle, a shaft journalled in said bearing, a gear on said shaft meshing with the gear on the wheel, a laterally disposed driving shaft and a universal joint connecting said shafts.

8. A road vehicle comprising a frame, a leaf spring arranged at each side of the frame and connected at its ends to said frame, a bracket secured to each spring at its center and rigid means connecting the brackets on opposite sides of the frame together, a rigid equalizing beam fulcrumed on each bracket, spindles rigidly secured in the ends of the beams, wheels journalled on said spindles and an independent flexible driving shaft connected with each wheel.

9. A road vehicle comprising a frame, a leaf spring arranged at each side of the frame and connected at its ends to said frame, a bracket secured to each spring at its center, rigid means connecting the brackets on opposite sides of the frame together, a rigid equalizing beam fulcrumed on each bracket, spindles rigidly secured in the ends of the beams, wheels journalled on said spindles, a power transmission housing secured to said frame, laterally extending drive shafts extending from the housing to the wheels and universal joints in said drive shafts.

10. A vehicle comprising a frame, a rigid equalizing beam arranged at each side of the frame, means to which the beam is pivotally connected, resiliently connecting the beam to the frame, spindles rigidly secured in the ends of the said beams, wheels journalled on said spindles, a gear secured to each wheel, a bearing secured to each beam, a shaft journalled in each of said bearings, driving means between each of said shafts and said wheel gears, a laterally disposed driving shaft and universal joints connecting each of said shafts.

11. A vehicle comprising a frame, spring means at each side of the frame and connected to said frame, a bracket carried by said spring means, a rigid member connecting together said brackets on opposite sides of the frame, an equalizing beam fulcrumed on each bracket, spindles rigidly connected to each end of each equalizing beam, and wheels mounted on said spindles.

12. In a vehicle, a frame, a bracket on each side of the frame, spring means connecting said brackets to said frame, rigid means connecting the brackets on opposite sides of the frame together, an equalizing beam fulcrumed on each bracket, spindles rigidly secured in the ends of the beams, wheels journalled on said spindles, a power transmission housing secured to said frame, drive shafts extending laterally from the housing to the wheels, and universal joints in said drive shafts.

13. In a vehicle, a frame, a transversely disposed rigid member, a bracket secured at each end of said rigid member, spring means connecting said brackets to said frame, equalizing beams fulcrumed on said rigid member, spindles rigidly secured to the ends of said equalizing beams, wheels journalled on said spindles, a power transmission supported by said frame, drive shafts extending laterally from said housing to the wheels, and flexible driving means in said drive shafts.

14. A vehicle comprising a frame, a rigid transverse member, equalizing beams on each side of the frame and fulcrumed on said rigid member, spindles rigidly secured to said beams, and wheels journalled on said spindles.

15. A vehicle containing a frame, a rigid transverse member, equalizing beams pivoted on said rigid member, spindles rigidly fixed to said equalizing beams, wheels journalled on said spindles, and driving means operatively connected to said wheels.

16. A vehicle driving unit comprising a rigid transverse member, equalizing beams pivoted at each end of said transverse member, spindles rigidly secured in the ends of said beams, wheels journalled on said spindles, and driving means operatively connected to said wheels.

17. A vehicle driving unit comprising a rigid transverse member, a bracket secured to and near each end of said transverse member, spring means connected to said brackets, equalizing beams fulcrumed at each end of said transverse member, spindles rigidly secured at the ends of the equalizing beams, wheels journalled on said spindles, and driving means operatively connected to said wheels.

In testimony whereof, we have hereunto set our hands.

ARTHUR H. LACEY.
C. MONROE CROSSON.